United States Patent [19]

Hanson, III

[11] Patent Number: 5,302,781
[45] Date of Patent: Apr. 12, 1994

[54] SIDEWALL CONTACT TEMPERATURE TOOL INCLUDING KNIFE EDGE SENSORS FOR CUTTING THROUGH MUDCAKE AND MEASURING FORMATION TEMPERATURE

[75] Inventor: Thomas H. Hanson, III, Bakersfield, Calif.

[73] Assignee: Schlumberger Technology Corporation, Houston, Tex.

[21] Appl. No.: 13,906

[22] Filed: Feb. 5, 1993

[51] Int. Cl.$^5$ ............................................. G01V 1/40
[52] U.S. Cl. ..................................... 181/102; 367/25; 367/911; 73/152; 73/154; 324/367; 166/250; 175/48; 175/50
[58] Field of Search ............................ 367/25, 35, 911; 181/102, 104, 105; 73/152, 153, 154; 324/367; 166/250; 175/40, 48, 50

[56] References Cited

U.S. PATENT DOCUMENTS

| | | | |
|---|---|---|---|
| 2,588,717 | 3/1952 | Goodwin | 324/367 |
| 3,668,927 | 6/1972 | Howell et al. | 73/154 |
| 3,914,686 | 10/1975 | Brooks | 324/351 |
| 4,689,572 | 8/1987 | Clark | 324/341 |
| 4,881,406 | 11/1989 | Coury | 73/154 |

Primary Examiner—Ian J. Lobo
Attorney, Agent, or Firm—Henry N. Garrana; John H. Bouchard

[57] ABSTRACT

A sidewall contact parameter tool, adapted to be disposed in a mud-filled wellbore, includes a pad assembly, in accordance with the present invention, which is adapted to cut through mudcake and measure a parameter of a formation disposed under the mudcake. The wellbore wall includes a mudcake and an earth formation disposed under the mudcake. The pad assembly includes at least one formation parameter sensor, and the formation parameter sensor includes a base portion and a knife edge portion integrally connected to the base portion. The base portion of each formation parameter sensor is adapted to contact a surface of the mudcake but the knife edge portion is adapted to cut into the mudcake and contact or penetrate a surface of the earth formation disposed under the mudcake. The knife edge portion of each sensor includes an internal space or pinhole aperture, and a parameter sensing apparatus disposed within the internal space or aperture. When an arms assembly extends the pad assembly radially in the wellbore and the pad assembly contacts the wall of the wellbore in response to the force applied to the arms assembly by a spring in a hydraulics assembly, the sensing apparatus disposed within the internal space of the knife edge portion senses the parameter of the earth formation under the mudcake but not the parameter of the mudcake. The tool also includes a mud temperature sensor for sensing mud temperature and a mud pressure sensor for sensing mud pressure, the mud temperature and mud pressure being used to check and confirm the accuracy of the formation parameter measured by the parameter sensing apparatus in the knife edge portion of the formation parameter sensor.

22 Claims, 9 Drawing Sheets

SIDEWALL CONTACT TEMPERATURE TOOL INCLUDING KNIFE EDGE SENSORS FOR CUTTING THROUGH MUDCAKE AND MEASURING FORMATION TEMPERATURE

BACKGROUND OF THE INVENTION

The subject matter of the present invention relates to apparatus for measuring a temperature in a wellbore, and more particularly, to a sidewall contact temperature tool adapted to be disposed in a wellbore including a pad assembly having a pair of sensors, each sensor of the pad assembly including a knife edge for cutting into a mudcake disposed on a wall of the wellbore and contacting an earth formation traversed by the wellbore for measuring a temperature of the formation and not the mudcake.

When a well tool apparatus is disposed in a wellbore, mud normally fills the hole; as a result, the mud accumulates on a wall of the formation traversed by the wellbore thereby forming a mudcake. Various wellbore apparatus of the prior art have measured the temperature of the mud in the wellbore, and other wellbore apparatus have measured the resistivity of the formation traversed by the wellbore. For example, a prior art wellbore apparatus known as the Microlog Resistivity Tool (MLT), available from Schlumberger Technology Corporation, Houston, Tex., measures the resistivity of the formation traversed by the wellbore. The MLT included a tool body, an arms assembly connected to the tool body, and a pad assembly connected to the arm assembly for measuring the resistivity of the formation when the arm assembly, in response to instructions from the tool body, extends the pad assembly into contact with the mudcake which has accumulated on the wall of the formation. The pad assembly of the MLT was smooth on its base, the smooth base of the pad assembly contacting the mudcake (and not the formation) when the resistivity of the formation was measured. In addition, another prior art wellbore apparatus known as the Measure While Perforating Sonde included a probe sensor for measuring the temperature of the fluid in the wellbore, and a separate sensor for measuring the pressure of the fluid in the wellbore. However, none of the aforementioned prior art wellbore apparatus measured the actual temperature of the formation, and not the mudcake, which is traversed by the wellbore.

SUMMARY OF THE INVENTION

Accordingly, it is a primary object of the present invention to provide a wellbore apparatus which includes one or more temperature sensors which measure the actual temperature of the earth formation traversed by the wellbore.

It is a further object of the present invention to provide a wellbore apparatus which includes one or more temperature sensors which measure the actual temperature of the earth formation, and not the temperature of a mudcake, traversed by the wellbore.

It is a further object of the present invention to provide an apparatus adapted to be disposed within a mud-filled wellbore which includes one or more formation temperature sensors which measure the actual temperature of an earth formation, and not the temperature of a mudcake disposed over the earth formation in the wellbore, and a separate mud temperature sensor for measuring the temperature of the mud in the wellbore thereby checking the accuracy of the formation temperature reading measured or read by the one or more formation temperature sensors.

It is a further object of the present invention to provide an apparatus adapted to be disposed within a mud-filled wellbore which includes one or more formation temperature sensors which measure the actual temperature of an earth formation, and not the temperature of a mudcake disposed over the earth formation in the wellbore, a separate mud temperature sensor for measuring the temperature of the mud in the wellbore and a separate mud pressure sensor for measuring the pressure of the mud in the wellbore, the mud temperature sensor and mud pressure sensor collectively checking the accuracy of the formation temperature reading measured or read by the one or more formation temperature sensors.

It is a further object of the present invention to provide a wellbore apparatus including a pad assembly adapted to contact a wall of the wellbore, the wall including a mudcake and an earth formation disposed under the mudcake, the pad assembly including at least one sensor, the sensor including a knife edge for cutting into the mudcake and contacting the formation and a sensing apparatus disposed within the knife edge for measuring a temperature of the formation under the mudcake.

It is a further object of the present invention to provide an apparatus adapted to be disposed in a mud-filled wellbore including a pad assembly adapted to contact a wall of the wellbore, a first sensor for meauring a temperature of the mud in the wellbore, and a second sensor for measuring a pressure of the mud in the wellbore, the wall of the wellbore including a mudcake and a formation disposed under the mudcake, the pad assembly including a third sensor having a knife edge for cutting into the mudcake and contacting the formation and a sensing apparatus disposed within the knife edge for measuring a temperature of the earth formation disposed under the mudcake.

In accordance with these and other objects of the present invention, a sidewall contact temperature tool (SCTT) is adapted to be disposed in a mud-filled wellbore. The SCTT includes a main body which includes a hydraulics assembly and an electronics assembly, an arms assembly connected to the hydraulics assembly of the main body for extending radially (opening) in response to a force applied to the arms assembly by a spring and for retracting (closing) in response to a force applied to the arms assembly by the hydraulics assembly, and a pad assembly, in accordance with the present invention, connected to the arms assembly and adapted to contact a wall of the wellbore. The wall of the wellbore includes a mudcake and an earth formation disposed underneath the mudcake. The pad assembly includes at least one sensor and preferably two sensors, each sensor including a base portion and a knife edge portion integrally connected to the base portion in accordance with the present invention. The base portion of each sensor is adapted to contact a surface of the mudcake but the knife edge portion of each sensor is adapted to cut into the mudcake and contact a surface of the earth formation disposed under the mudcake. The knife edge portion of each sensor includes an internal cavity, and a sensing apparatus disposed within the internal cavity. When the arms assembly extends the pad assembly radially and the pad assembly contacts the wall of the wellbore in response to the force applied to the arms assembly by the spring, the sensing apparatus disposed within the internal cavity of the knife edge portion senses the temperature of the earth formation, but not the temperature of the mudcake. The SCTT also includes a mud temperature sensor for sensing mud temperature and a mud pressure sensor for sensing mud pressure, the mud temperature and mud pressure being used to check and confirm the accuracy of the formation temperature from the sensing apparatus in the knife edge portion.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein.

DETAILED DESCRIPTION OF THE PREFERRED EMBODIMENT

Figure 1:
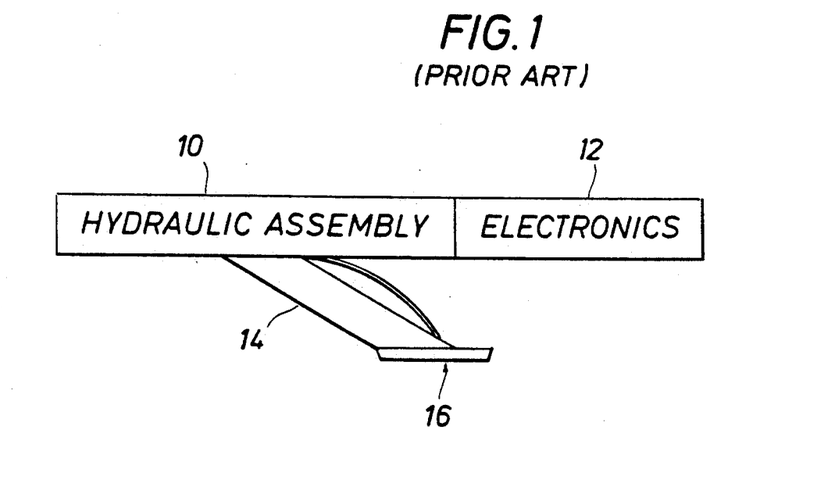
FIG. 1 illustrates a prior art Microlog Resistivity Tool (MLT) which, when disposed in a wellbore, measures the resistivity of a formation traversed by the wellbore.

Referring to FIG. 1, a prior art wellbore apparatus, known as the Microlog Resistivity Tool (MLT), adapted for measuring the resistivity of a formation traversed by the wellbore, is illustrated. In FIG. 1, the MLT tool included a hydraulics assembly 10, an electronics section 12, an arms assembly 14 connected to the hydraulics assembly 10, and a pad assembly 16 connected to the arms assembly 14. As shown more clearly in FIGS. 12a-12b, a spring connected to the arms assembly 14 extends the arms assembly outwardly in a radial direction causing the pad assembly 16 to contact a wall of the wellbore, however, the hydraulics assembly 10 applies a force to the arms assembly 14 thereby retracting the arms assembly 14 back to its original unextended position. The pad assembly 16 is adapted for contacting the wall of a wellbore; in the case of the MLT, a resistivity of the formation traversed by the wellbore is measured.

Figure 2:
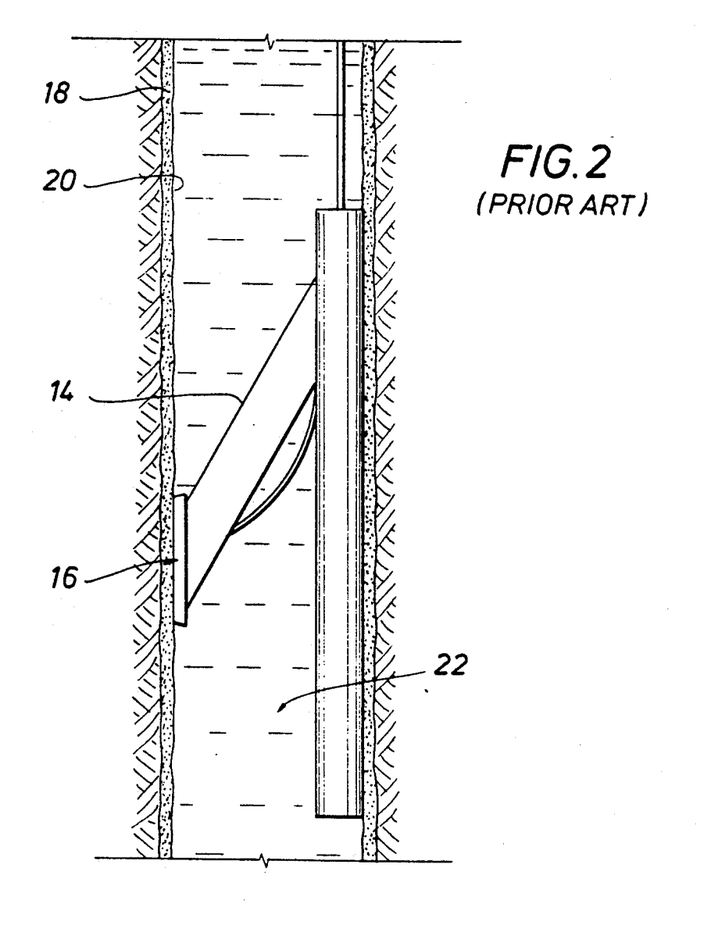
FIG. 2 illustrates the prior art MLT tool of FIG. 1 disposed in a wellbore including a main body, an arms assembly connected to the main body, and a pad assembly connected to the arms assembly, the pad assembly being in contact with a mudcake on a wall of the wellbore when the arms assembly pushes the pad assembly into contact with the wellbore wall for measuring the resistivity of the formation traversed by the wellbore.

Referring to FIG. 2, the prior art MLT tool of FIG. 1 is shown disposed in the wellbore. In FIG. 2, the wellbore is filled with mud 22; as a result, a mudcake 20 accumulates on an external wall of the earth formation 18. The pad assembly 16 of the tool contacts a surface of the mudcake 20 when the arms assembly 14 extends the pad assembly 16 outwardly in a radial direction in response to the force of a spring which is connected to the arms assembly 14. Since the pad assembly 16 contacts the mudcake 20, no physical contact is made between the pad assembly 16 and the external wall 18 of the formation. The pad assembly 16 contains sensors which measure resistivity; if, however, temperature sensors were disposed within the pad assembly 16, the temperature sensors would measure the temperature of the mudcake 20, not the temperature of the earth formation 18. The MLT tool of FIGS. 1 and 2 is available from Schlumberger Technology Corporation, P.O. Box 2175, Houston, Tex. 77252-2175.

Figure 3:
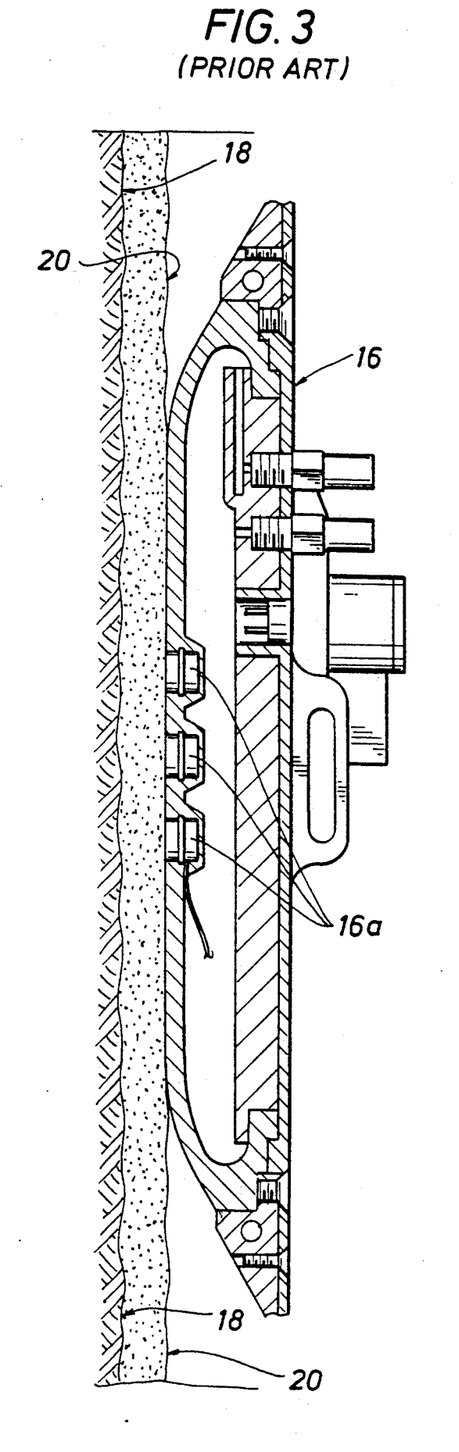
FIGS. 3-4 illustrate the pad assembly of the prior art MLT tool of FIG. 2.
Figure 4:
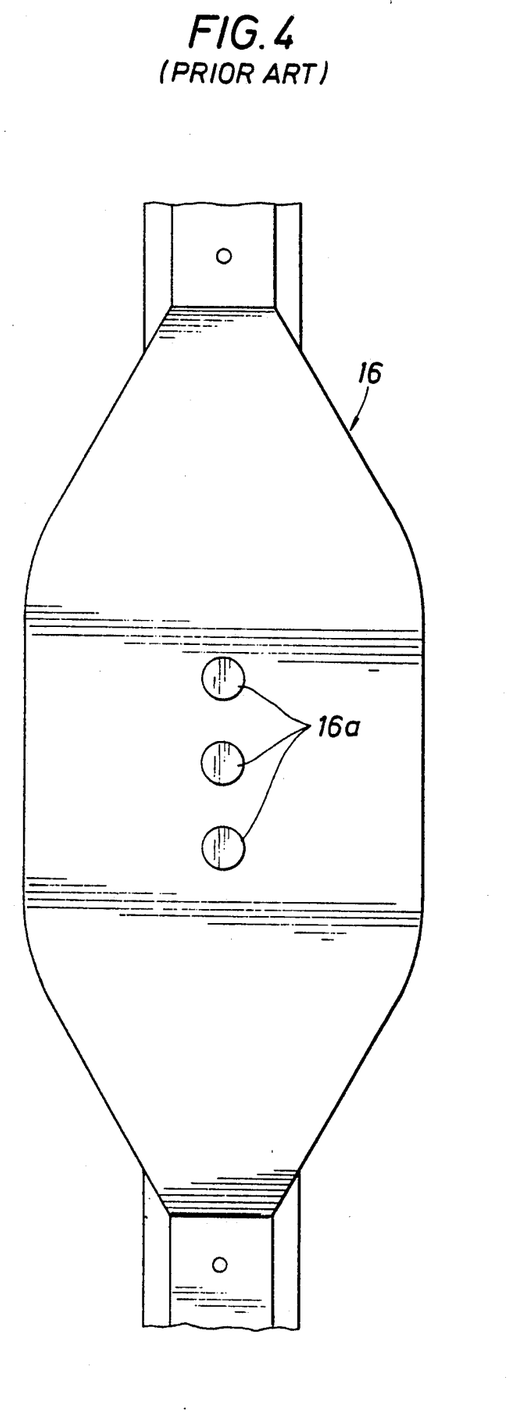

Referring to FIGS. 3 and 4, an enlarged view of the pad assembly 16 associated with the prior art MLT tool of FIGS. 1 and 2 is illustrated. FIG. 3 illustrates a side view of the pad assembly 16, and FIG. 4 illustrates a bottom view of the pad assembly 16. In FIG. 3, the pad assembly 16 includes sensors 16a which measure resistivity of the formation 18. In FIG. 4, the bottom side of the pad assembly 16 shows a smooth surface, with holes for sensors 16a. In operation, the pad assembly 16 of FIGS. 3 and 4 is designed to glide along the surface of the wellbore wall, riding along the top of the mudcake 20. If the sensors 16a in FIGS. 3-4 were replaced by temperature sensors, the temperature measured by the sensors would represent the temperature of the mudcake 20, not the temperature of the formation 18. Accordingly, if a temperature of the formation 18, and not the mudcake 20, is required, the pad assembly 16 must be redesigned to measure formation temperature and not mudcake temperature. In addition, since, under certain circumstances, the newly redesigned pad assembly may inadvertently be reading the temperature of the mud 22 in the wellbore and not the temperature of the formation 18, a separate apparatus is needed for verifying that the formation temperature is being read, and not the mud temperature.

Figure 5:
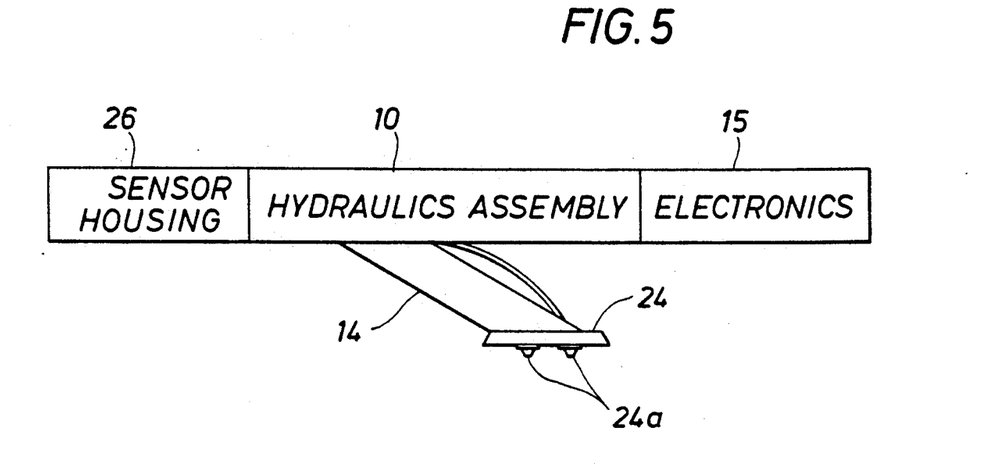
FIG. 5 illustrates a block diagram of the sidewall contact temperature tool (SCTT) of the present invention.

Referring to FIG. 5, a block diagram of the sidewall contact temperature tool (SCTT) of the present invention, and more particularly, the newly redesigned pad assembly associated with the SCTT is illustrated.

In FIG. 5, the SCTT includes a hydraulics assembly 10 (applicant's part number H341614), an electronics assembly 15, and an arms assembly 14, the same hydraulics assembly and arms assembly which was used in association with the prior art MLT tool that is discussed above with reference to FIG. 1 of the drawings. However, the SCTT further includes a new sensor housing 26 and a new pad assembly 24, the new pad assembly 24 including a pair of temperature sensors 24a, where each temperature sensor 24a includes a knife edge portion for cutting into the mudcake 20 and contacting the earth formation 18.

Figure 6:
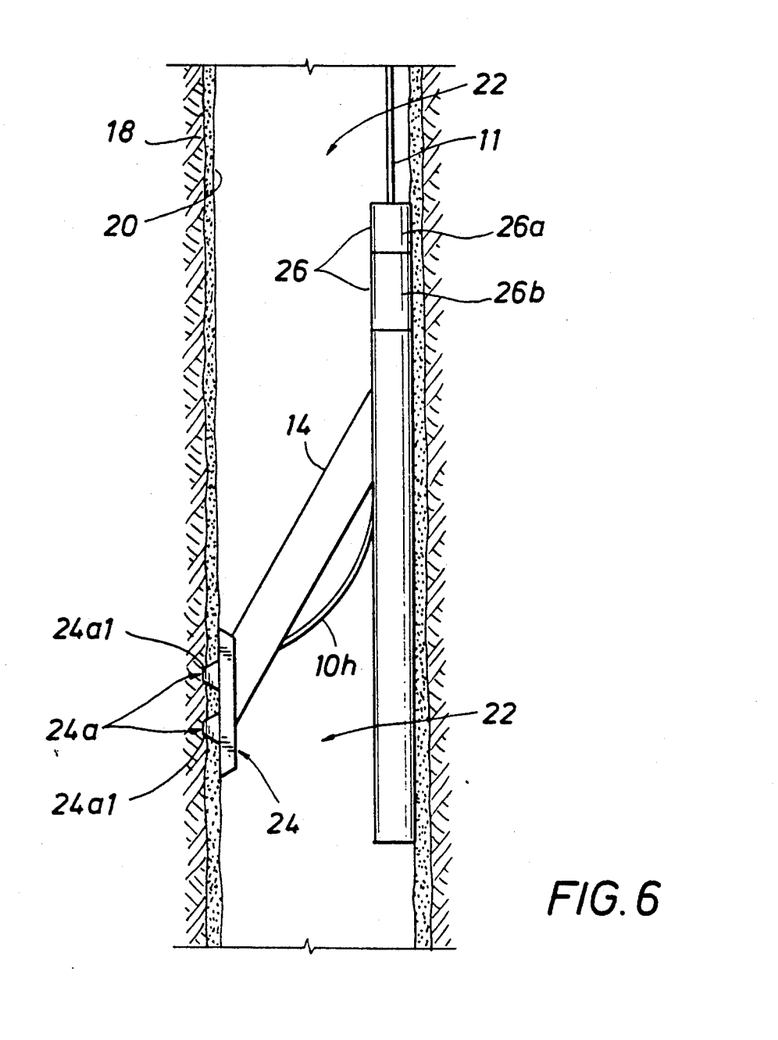
FIG. 6 illustrates the SCTT tool of FIG. 5 disposed in a wellbore including a mud temperature sensor, a mud pressure sensor, and a novel pad assembly in accordance with the present invention which includes a pair of formation temperature sensors, each formation temperature sensor including a knife edge portion for cutting into a mudcake on a wall of the wellbore and measuring a temperature of the earth formation under the mudcake.

Referring to FIG. 6, the SCTT tool of FIG. 5 is shown suspended by a wireline 11 in a wellbore. As before, the wall of the wellbore includes a mudcake 20 disposed over the earth formation 18, and mud 22 is disposed within the wellbore. The new pad assembly 24 includes the two new formation temperature sensors 24a, each formation temperature sensor 24a including a knife edge portion 24a1, in accordance with one major aspect of is the present invention, which cuts into the mudcake 20 and penetrates the earth formation 18 thereby measuring the temperature of the earth formation 18 and not the mudcake 20. In addition, the new sensor housing 26 includes a mud pressure sensor 26b and a mud temperature sensor 26a. The mud pressure sensor 26b is available from Paine Instruments, Seattle, Wash., part number 211-36-070-03. The mud temperature sensor 26a is available from HyCal Engineering, El Monte, Calif., part number EL-705-4-2-12.

In operation, referring to FIG. 6, when the SCTT tool is lowered into the wellbore, a spring connected to the arms assembly 14 will extend the arms assembly 14 and the pad assembly 24 outwardly in a radial direction. The knife edge portion 24a1 of the sensors 24a will bite into the mudcake 20, penetrate the mudcake 20, and contact and perhaps penetrate the formation 18 traversed by the wellbore. If the knife edge portion 24a1 of the formation temperature sensors 24a cuts into the mudcake enough 20 to contact and perhaps penetrate the earth formation 18, the temperature of the formation 18, and not the mudcake 20, will be measured. The formation temperature of the earth formation 18 as measured by formation temperature sensors 24a is usually different than the mud temperature measured by the mud temperature sensor 26a; but if the knife edge portion 24a1 does not cut into the mudcake 20 enough to penetrate or contact the formation 18, the formation temperature sensors 24a will measure mud temperature and not formation temperature and the reading of formation temperature sensors 24a will be nearly the same as the reading of mud temperature sensor 26a. As a result, an operator at the wellbore surface will be able to accurately determine if the temperature reading of the formation temperature sensors 24a reflects the temperature of the formation 18 and not merely the temperature of the mud 22. In the meantime, the mud pressure sensor 26b measures the hydrostatic pressure of the mud in the wellbore. In the case of gas flow into the wellbore, a resultant change in mud pressure gradient will correlate to a lower mud temperature reading due to the cooling effect of the expanding gas as measured by the mud temperature sensor 26a. Flow of water or oil into the wellbore could also be detected by a change in the mud pressure gradient. In these types of cases, any change in the mud pressure gradient, as measured by mud pressure sensor 26b may correspond to a change in mud temperature, as measured by mud temperature sensor 26a, at the same depth. Thus, the mud pressure sensor 26b will help in the interpretation of the temperature readings taken by mud temperature sensor 26a and formation temperature sensors 24a. When the arms assembly 14 extends the pad assembly 24 outwardly in a radial direction, enough to cause the knife edge portion 24a1 of the formation temperature sensors 24a to cut into the mudcake 20 and contact/penetrate the earth formation, an operator at the surface of the wellbore of FIG. 6 pulls upwardly on the wireline 11. During the upward movement, in the wellbore, of the SCTT tool of FIG. 6, the knife edge portion 24a1 of the formation temperature sensors 24a will continue to cut into the mudcake 20 and will continue to contact or penetrate the earth formation 18. As a result, during the upward movement of the SCTT tool in the wellbore, the temperature of the formation 18 (and not the temperature of the mudcake 20 or the temperature of the mud 22) will be read at differing depths in the wellbore.

Figure 7:
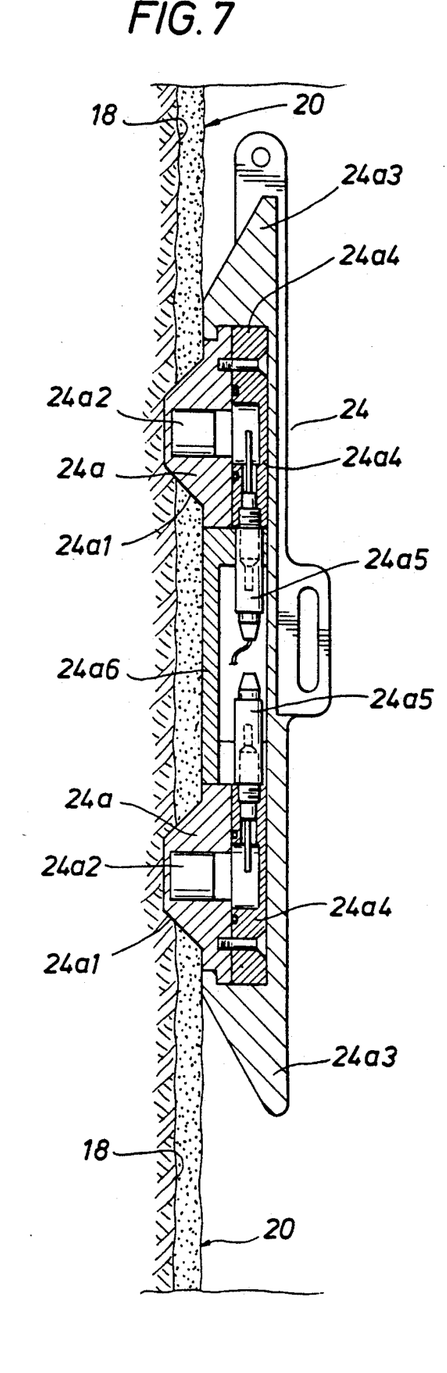
FIG. 7 illustrates a cross section of the novel pad assembly of FIG. 6.

Referring to FIG. 7, one embodiment of the newly redesigned pad assembly 24 associated with the SCTT tool of FIGS. 5-6 is illustrated.

In FIG. 7, the pad assembly 24 has been extended outwardly in the radial direction by the arms assembly 14 until the pad assembly contacts the mudcake 20. The knife edge portion 24a1 of the formation temperature sensors 24a have cut into the mudcake 20, penetrating the mudcake, and now penetrate and make contact with the earth formation 18. The knife edge portion 24a1 of each formation temperature sensor 24a includes a space 24a2, and a temperature sensing apparatus is disposed within the space 24a2 for converting a sensed temperature of the formation 18 into an electrical signal indicative of the sensed temperature of the formation 18. The temperature sensing apparatus disposed within the space 24a2 can be purchased from HyCal Engineering, El Monte, Calif. The pad assembly 24 further includes a base member 24a3 having an internal cavity wherein a number of components are securely disposed: (1) two feedthru members 24a4 are disposed within the internal cavity, one for each of the two formation temperature sensors 24a, a formation temperature sensor 24a being disposed directly on top of the feedthru member 24a2, an electrical connector probe 24a5 connected to electronics 15 being disposed through the feedthru member 24a2 and making electrical contact with the temperature sensing apparatus disposed within space 24a2; and (2) a support member 24a6 is disposed within the internal cavity between each feedthru member 24a4 holding the feedthru members 24a4 and their respective formation temperature sensors 24ain place within the internal cavity of base member 24a3.

Figure 8:
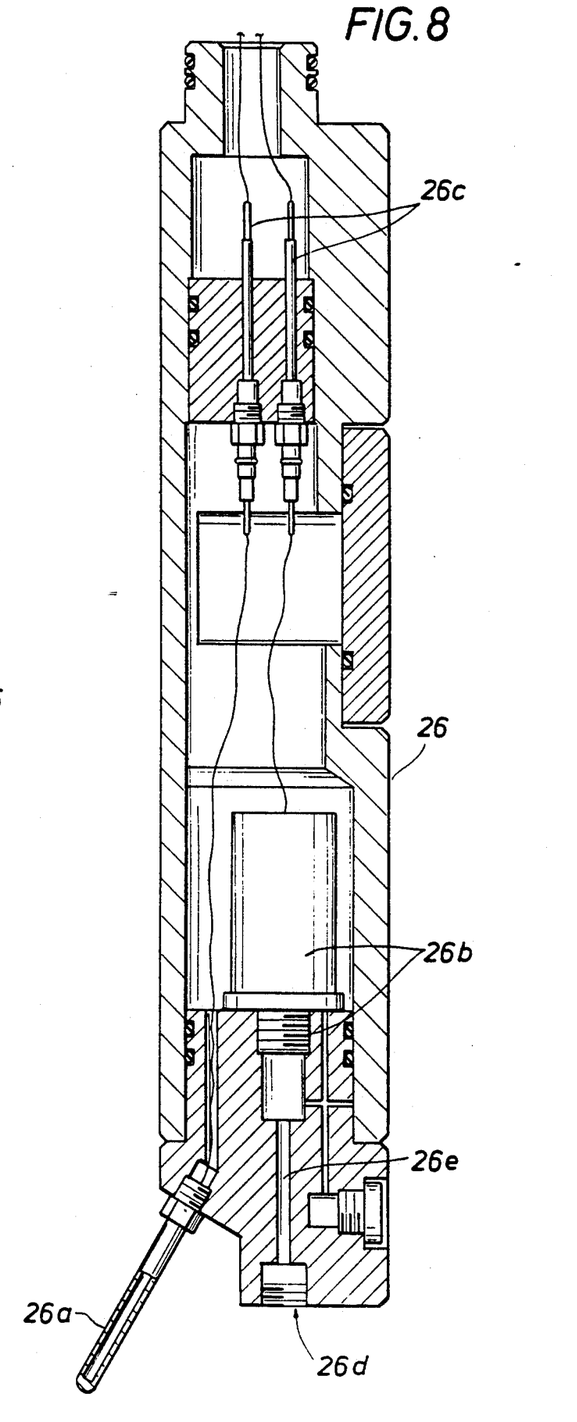
FIG. 8 illustrates the mud temperature sensor and mud pressure sensor of FIG. 6;.

Referring to FIG. 8, a detailed construction of the sensor housing 26 is illustrated. In FIG. 8, the sensor housing 26 includes a temperature sensor probe 26a which converts the temperature of mud 22 into electrical signals and a pressure sensor 26b which converts the pressure of mud 22 into electrical signals, the electrical signals being transmitted to electronics assembly 15 of FIG. 5 via the feedthru connectors 26c in FIG. 8. The mud 22 in the wellbore enters a port 26d located on a bottom end of the sensor housing 26 and fluidly communicates with the pressure sensor 26b via an orifice 26e. The temperature sensor probe 26a is a finger-like object that protrudes outwardly into the wellbore for measuring the temperature of the mud 22.

Referring to FIGS. 9a-9L, the various components which comprise the pad assembly 24 of FIG. 7 is illustrated. These components have already been discussed when assembled together with reference to FIG. 7, but are now disassembled in FIGS. 9a-9f for purposes of a more thorough discussion.

Figure 9A:
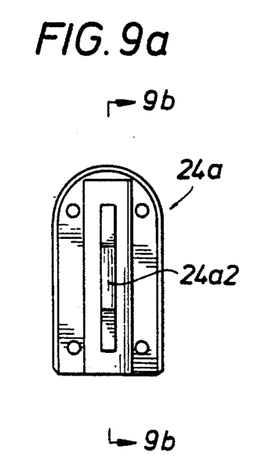
FIGS. 9a-9L illustrate various views of individual components which, when put together, comprise the novel pad assembly of FIG. 7, FIGS. 9a-9d illustrating the novel formation temperature sensor having a knife edge portion for use with the pad assembly of FIG. 7 in accordance with the present invention, FIGS. 9e-9g illustrating the base member of the pad assemblies of FIGS. 7 and 10, FIGS. 9h-9j illustrating the feedthru members of the pad assemblies of FIGS. 7 and 10, and FIGS. 9k-9L illustrating the support member of the pad assemblies of FIGS. 7 and 10.
Figure 9B:
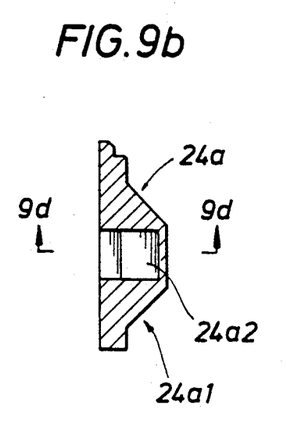
Figure 9C:
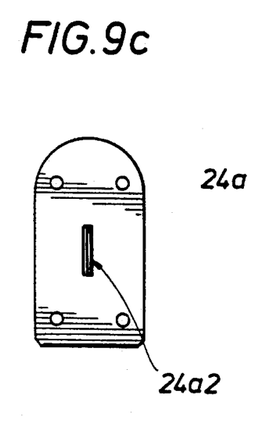
Figure 9D:
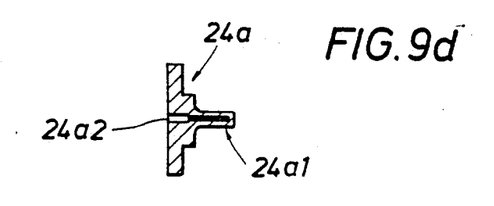

In FIGS. 9a-9d, the formation temperature sensor 24a of FIGS. 5-7 is illustrated. FIG. 9a illustrates a bottom view of the formation temperature sensor 24a; FIG. 9b illustrates a front cross sectional view of the sensor 24a, taken along section lines 9b—9b of FIG. 9a; FIG. 9d illustrates a side cross sectional view of the sensor 24a taken along section lines 9d—9d of FIG. 9b; and FIG. 9c illustrate a bottom view of the formation temperature sensor 24a. Note in FIG. 9a the space 24a2 where the temperature sensing apparatus is disposed for sensing the temperature of the earth formation 18. In FIG. 9b, note the aforementioned space 24a2, and the knife edge portion 24a1 of the sensor. In FIG. 9d, a particularly good view of the knife edge portion 24a1 of the sensor 24a is illustrated, the knife edge portion 24a1 cutting into the mudcake 20, contacting and penetrating the earth formation 18 for measuring the temperature of the earth formation 18 and not the mudcake 20. In FIG. 9c, note the space 24a2.

Figures 9E, 9F:
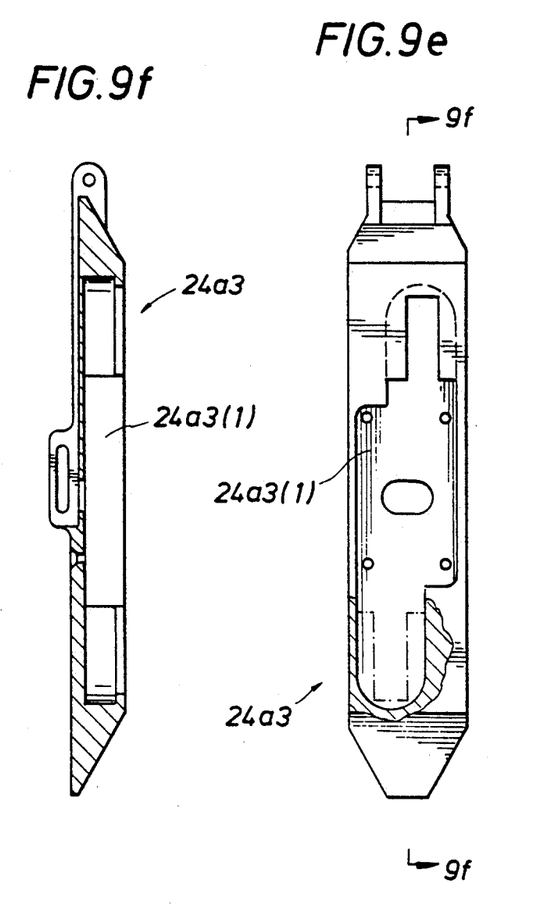
Figure 9G:
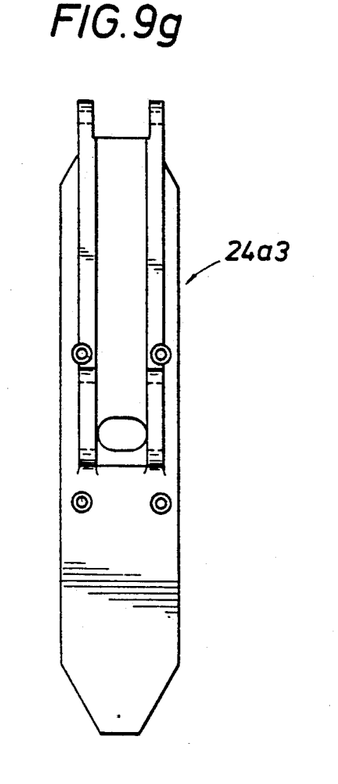
Figure 9H:
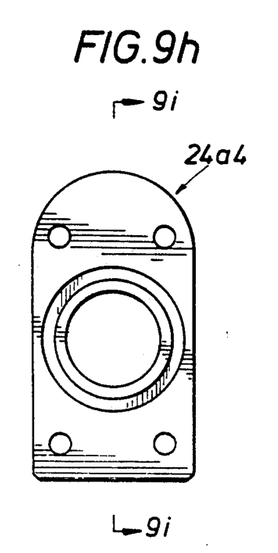
Figure 9I:
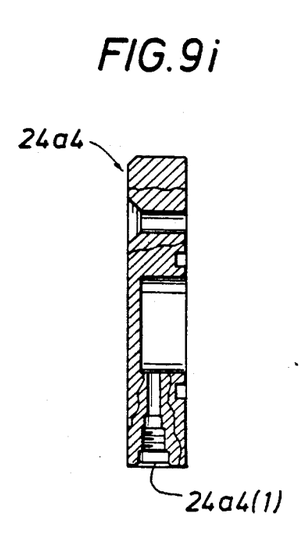
Figure 9J:
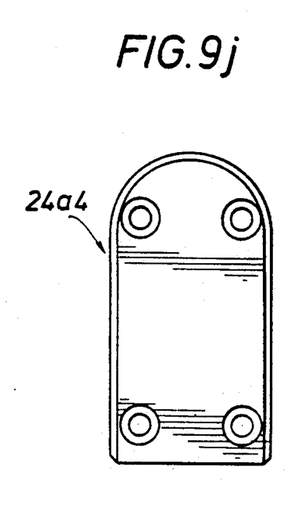
Figure 9K:
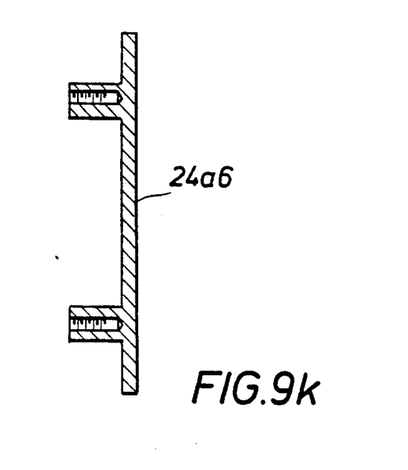
Figure 9L:
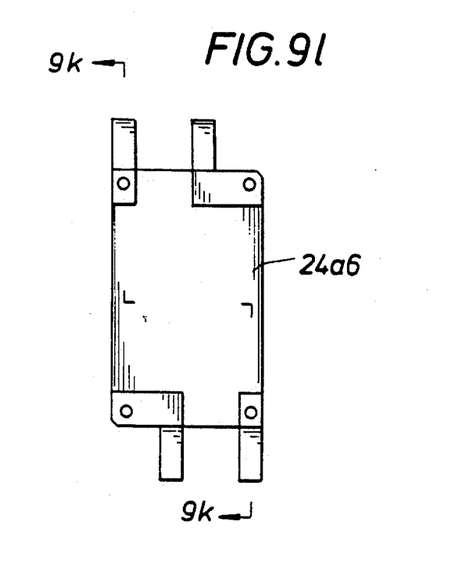

In FIGS. 9e-9L, a support member 24a6 is shown in FIGS. 9k-9L, a base member 24a3 is shown in FIGS. 9e-9g, and a feedthru member 24a4 is shown in FIGS. 9h-9j. Temporary reference to FIG. 7 reveals the location of each of these members in the construction of the pad assembly 24 of FIG. 7. In FIGS. 9e-9g, the base member 24a3 has an internal cavity 24a3(1) into which the support member 24a6, the feedthru members 24a4, and the formation temperature sensors 24a fit for constructing the pad assembly 24 of FIG. 7. In FIG. 9i, a feedthru hole 24a4(1) allows an electrical connector probe to pass therethrough for electrical connection to the temperature sensing apparatus located within space 24a2 of FIG. 9b (which senses the temperature of the formation 18). The electrical connector probe is also electrically connected to electronics 15 of FIG. 5.

Figures 10, 11D:
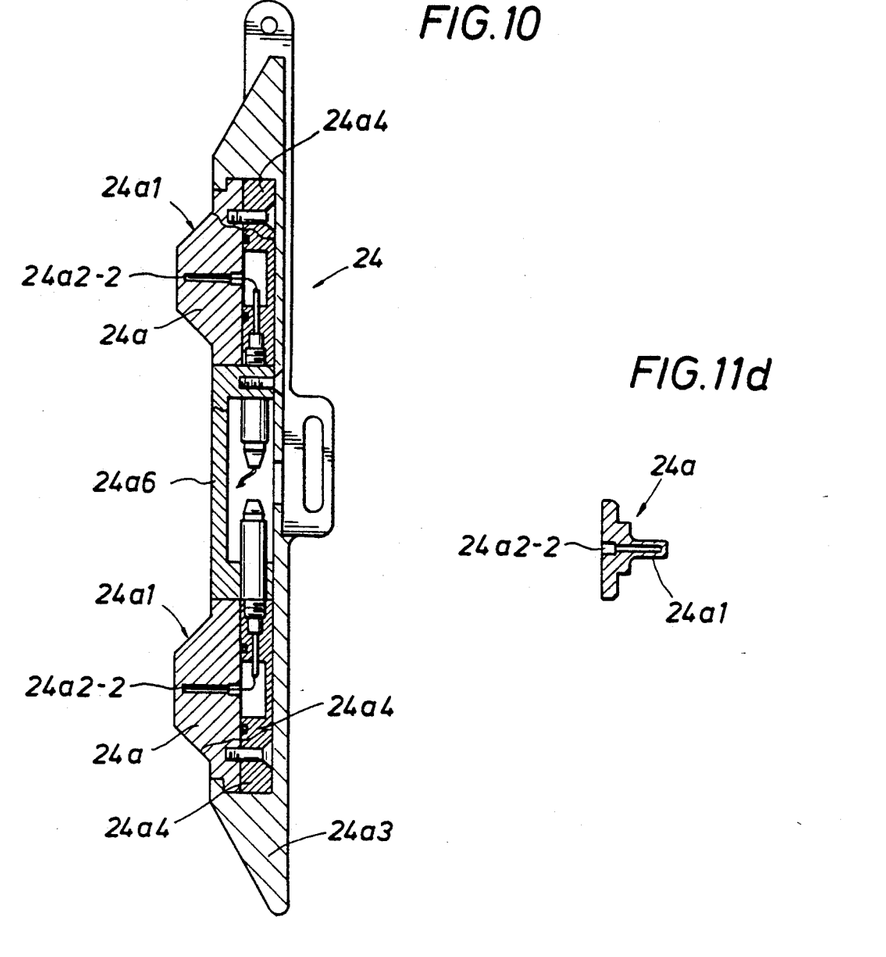
FIG. 10 illustrates a cross section of a novel and preferred pad assembly of FIG. 6 in accordance with the present invention.
FIGS. 11a-11d illustrate another novel and preferred formation temperature sensor including a knife edge portion for use with the pad assembly of FIG. 10 in accordance with the present invention and a pinhole aperature instead of a space disposed through the knife edge portion.

Referring to FIG. 10, another, more preferred embodiment of the newly redesigned pad assembly 24 associated with the SCTT tool of FIGS. 5-6 is illustrated.

In FIG. 10, the pad assembly 24 includes two formation temperature sensors 24a, each formation temperature sensor 24a including a knife edge portion 24a1 for cutting into the mudcake 20 and contacting the wall of the earth formation 18. Whereas the knife edge portion 24a1 of each formation temperature sensor 24a of FIGS. 7, 9a and 9b includes a space 24a2 and a temperature sensing apparatus disposed within the space 24a2, the knife edge portion 24a1 of each formation temperature sensor 24a of FIG. 10 includes a pinhole aperture 24a2-2 and a temperature sensing pin disposed within the pinhole aperture for sensing the temperature of the earth formation 18 and converting the sensed temperature into electrical signals indicative of the sensed temperature. The temperature sensing pin disposed within the pinhole aperture 24a2-2 can be purchased from HyCal Engineering, El Monte, Calif. The pad assembly 24 of FIG. 10 further includes the same other members used in connection with the FIG. 7 embodiment: a base member 24a3 having an internal cavity wherein two feedthru members 24a4 and a support member 24a6, in addition to the formation temperature sensors 24a, are disposed. As in FIG. 7, the two feedthru members 24a4 in FIG. 10 are disposed within the internal cavity, one for each of the two formation temperature sensors 24a. A formation temperature sensor 24a is disposed directly on top of the feedthru member 24a2, an electrical connector probe 24a5 connected to electronics being disposed through the feedthru member 24a2 and making electrical contact with the temperature sensing pin disposed within the pinhole aperture 24a2-2. A support member 24a6 is disposed within the internal cavity between the two feedthru members 24a4 for holding the feedthru members 24a4 and their respective formation temperature sensors 24a in place within the internal cavity of base member 24a3.

Figure 11A:
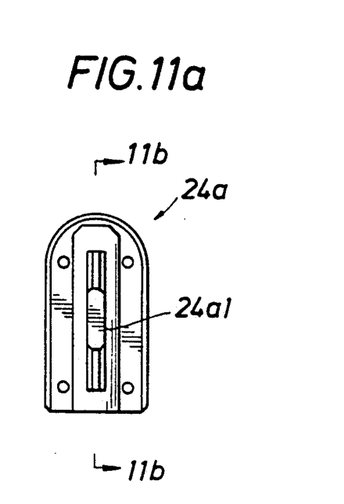
Figures 11B, 11C:
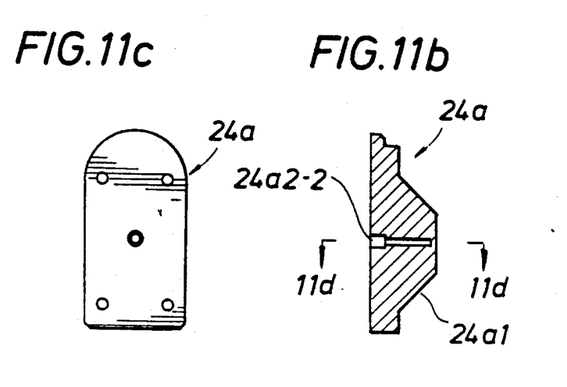

Referring to FIGS. 11a-11d, top, front, side and bottom views of another more preferred embodiment of the formation temperature sensor 24a of FIG. 10 is illustrated. FIG. 11b is a front view of the temperature sensor 24a taken along section lines 11b—11b of FIG. 11a; and FIG. 11d is a side view of the temperature sensor 24a taken along section lines 11d—11d of FIG. 11b. FIG. 11a is a top view and FIG. 11c is a bottom view of the formation temperature sensor 24a. FIG. 11d illustrates a good view of the knife edge portion 24a1 of the temperature sensor 24a through which the pinhole aperature 24a2-2 is disposed and in which the temperature sensing pin resides for converting formation 18 temperature to electrical signals. The base member 24a3, the support member 24a6, and the feedthru members 24a4 associated with the pad assembly 24 of FIG. 10 are illustrated in detail in FIGS. 9e-9L of the drawings.

Figure 12A:
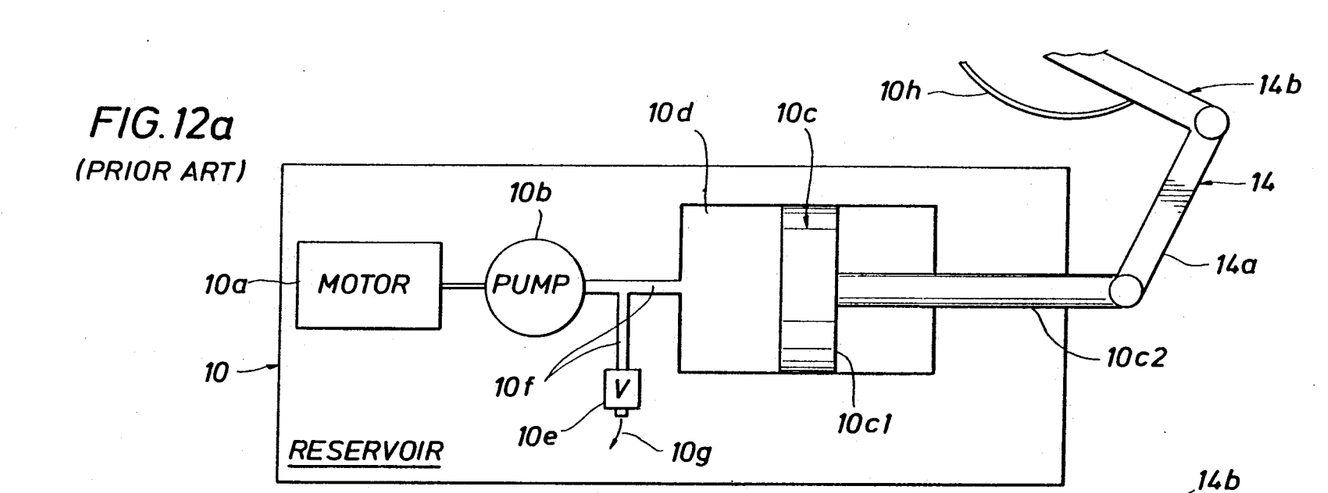
FIGS. 12a-12b illustrate a construction of the hydraulics assembly of FIGS. 1 and 5.
Figure 12B:
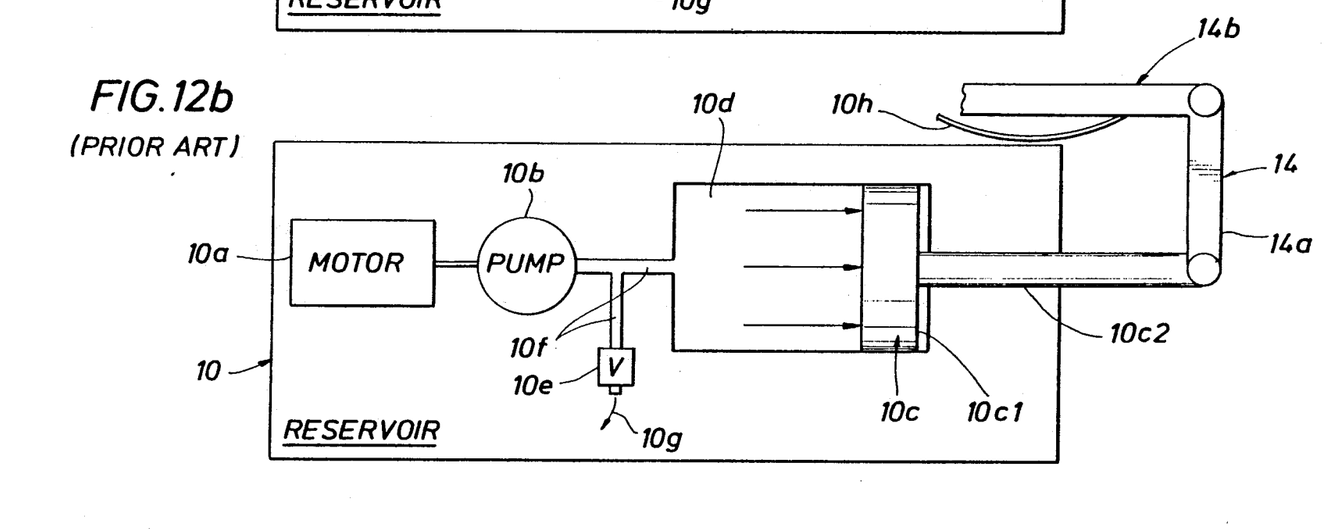

Referring to FIGS. 12a-12b, a construction of the prior art hydraulics assembly 10 of FIGS. 1 and 5 is illustrated. This hydraulics assembly 10 is set forth in the prior art Microlog Resistivity Tool (MLT) mentioned in the background section of this application.

In FIG. 12a, the hydraulics assembly 10 includes a motor 10a, a pump 10b mechanically connected to the motor 10a, a piston 10c defining a chamber 10d disposed on one side the of the piston 10c, the chamber 10d being filled with oil, and a solenoid 10e fluidly connected to the chamber 10d via a first fluid passageway 10f on one side of the solenoid 10e and fluidly connected to a second fluid passageway 10g on the other side of the solenoid 10e. The piston 10c includes a first part 10c1 and a second part 10c2 integrally connected to the first part 10c1. The arms assembly 14 is connected to the second part 10c2 of the piston 10c. In FIG. 12a, the arms assembly 14 includes a first arm 14a and a second arm 14b. A ninety-eight pound force spring 10h is connected to the second arm 14b of the arms assembly 14, one end of the spring being connected to the second arm 14b, the other end of the spring being connected to a stationary point.

A functional description of the hydraulics assembly 10 will be set forth in the following paragraph with reference to FIGS. 12a and 12b.

In FIG. 12a, initially, the solenoid 10e closes off fluid communication between the first fluid passageway 10f and the second fluid passageway 10g. With no fluid communication between these two passageways 10f and 10g, the motor 10a actuates the pump 10b, the pump 10b forcing the oil in chamber 10d to act against the first part 10c1 of the piston 10c thereby moving the piston 10c. In FIG. 12b, the high pressure of the oil in chamber 10d moves the piston 10c in the direction illustrated in FIG. 12b. As a result, the first and second arms 14a and 14b of the arms assembly 14 move from the position shown in FIG. 12a to the position shown in FIG. 12b. When the arms 14a and 14b moves to the position shown in FIG. 12b, the spring 10h is extended from a relaxed position to an extended position thereby exerting an inwardly directed force on the second arm 14b; however, as long as the pump 10b pressurizes the oil in chamber 10d thereby forcing the piston 10c to move to the position shown in FIG. 12b, the spring 10h will remain in the extended position. In response to an appropriate electrical signal, the solenoid 10e will now allow fluid to flow from the first fluid passageway 10f to the second fluid passageway 10g; and, as a result, the oil under pressure in chamber 10d will now flow from the chamber 10d, into the first fluid passageway 10f and into the second fluid passageway 10g via solenoid 10e. Since the oil is no longer forcing the piston 10c to remain in the position shown in FIG. 12b, the spring 10h in FIG. 12b, being in the extended position, will now force the first and second arms 14a and 14b to move from their position shown in FIG. 12b to the position shown in FIG. 12a; when the arms 14a and 14b move to the position shown in FIG. 12a, the arms assembly 14 is extended in the manner shown in FIG. 6 of the drawings.

Figure 13:
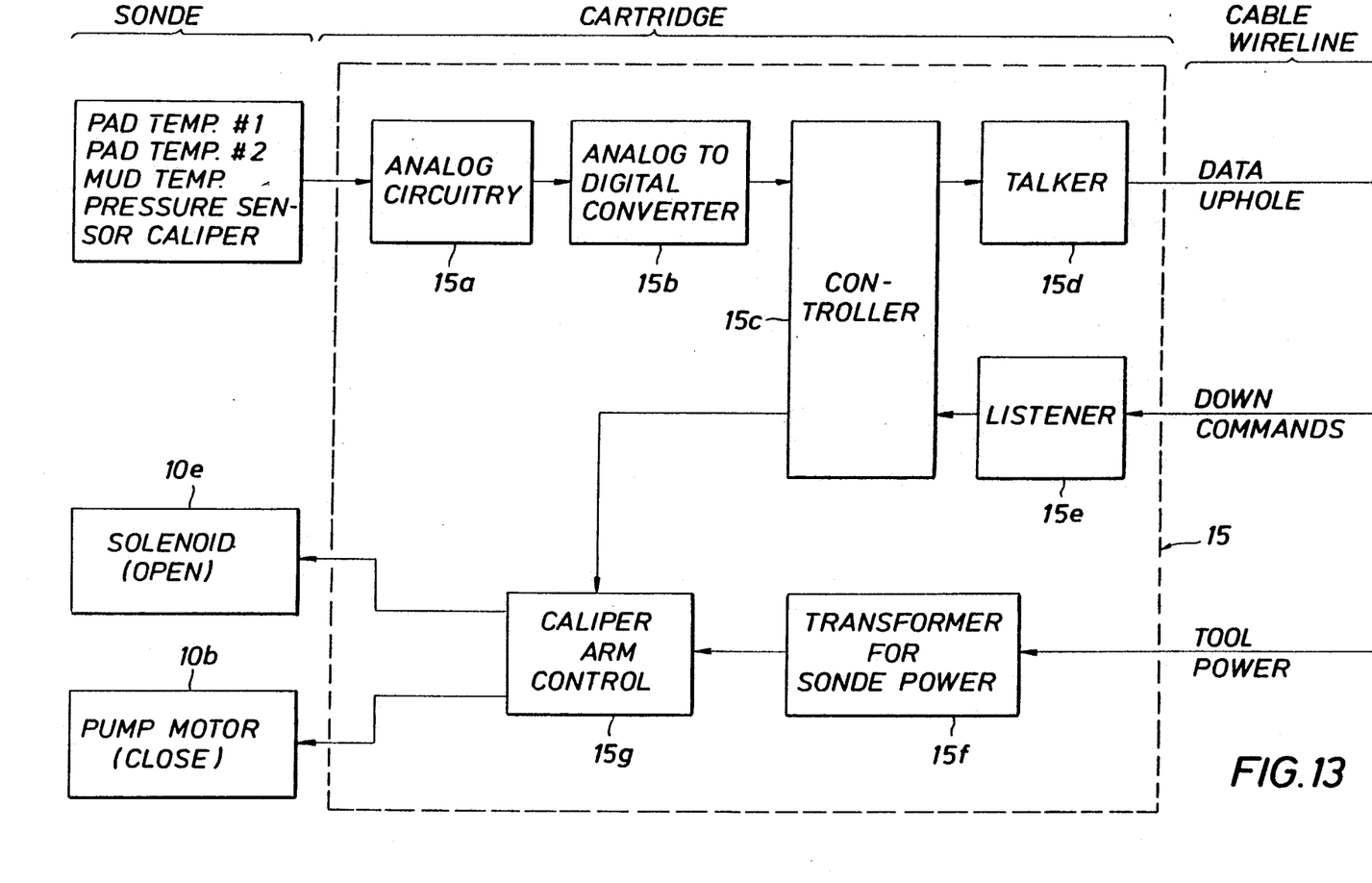
FIG. 13 illustrates a construction of the electronics assembly of FIG. 5.

Referring to FIG. 13, a construction of the electronics section 15 of FIG. 5 is illustrated.

In FIG. 13, the electronics section 15 essentially comprises two parts: a first part which takes an analog measurement downhole and sends the measurement data uphole to the wellbore surface, and a second part which receives command and power information from the wellbore surface uphole and transmits the information downhole to the solenoid 10e and/or the pump 10b for activating the solenoid to open fluid flow between the first and second passageways 10f and 10g allowing the arms assembly 14 to extend outwardly as shown in FIG. 6, and for operating the pump 10b to pressurize the oil in the chamber 10d to retract the arms assembly 14. In FIG. 13, the electronics section 15 comprises an analog circuit 15a connected to all formation temperature sensors in pad 24 and the mud temperature and pressure sensors in the new sensor housing 26 of FIG. 6, an analog to digital converter 15b, a controller 15c, a talker 15d, a listener 15e, a transformer (for sonde power) 15f, and a caliper arm control 15g connected to the solenoid 10e and to the pump 10b.

A functional description of the electronics section 15 will be set forth in the following paragraph with reference to FIG. 13.

The second part of the electronics section 15 operates as follows. Tool power, transmitted downhole from the wellbore surface, is input to the transformer 15f and ultimately to the caliper arm control circuit 15g. Commands are received by the listener 15e, the commands being input to the caliper arm control 15g via the controller 15c. The commands being input to the caliper arm control 15g from controller 15c indicate whether the caliper arm control 15g should allow the tool power from transformer 15f to power up the solenoid 10e or the pump 10b of FIGS. 12a–12b. When the solenoid 10e and pump 10b are powered with a first polarity, the solenoid 10e will prevent fluid communication between fluid passageways 10f and 10g and the pump 10b will pressurize the oil in chamber 10d thereby moving the piston 10c in the manner indicated in FIG. 12b to retract (inwardly) the arms assembly 14; however, when the solenoid 10e and pump 10b are powered with a second polarity, the solenoid will allow fluid communication between fluid passageways 10f and 10g thereby releasing the pressure of the oil in chamber 10d and allowing the spring 10h to extend (outwardly) the arms assembly 14 as shown in FIG. 6.

The first part of the electronics section 15 operates as follows. The formation temperature measured by both of the formation temperature sensors 24a (disposed in the knife edge portions 24a1 of the new pad assembly 24) as well as the mud temperature and mud pressure measured by mud pressure sensor 26b and the mud temperature sensor 26a of FIG. 6 are input to the analog circuit 15a for converting the sensor outputs into corresponding analog signals; and the analog signals output from the analog circuit 15a are input to the analog to digital converter 15b for converting the analog temperature and pressure signals from the analog circuit into digital signals. The controller 15c controls the input of the digital signals to the talker 15d, and the digital signals are transmitted uphole via the talker circuit 15d.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An apparatus adapted to be disposed in a wellbore for measuring one or more parameters associated with said wellbore, a mudcake adhering to a wall of a formation traversed by said wellbore, comprising: measurement means for measuring the parameter of said formation traversed by said wellbore, comprising:
   measurement means for measuring the parameter of said formation disposed under said mudcake and not the parameter of said mudcake, said measurement means including,
   a flat surface adapted for contacting a surface of said mudcake,
   a knife edge housing connected to and outwardly protruding from said flat surface adapted for cutting through said mudcake and penetrating said formation disposed under said mudcake, and
   temperature sensor means disposed within said knife edge housing for measuring a temperature of said formation disposed under said mudcake and not a temperature of said mudcake when said flat surface contacts the surface of said mudcake and said knife edge housing cuts into said mudcake and penetrates said formation disposed under said mudcake.

2. The apparatus of claim 1, wherein said wellbore is filled with a mud, said apparatus further comprising:
   mud parameter sensor means for measuring a parameter of said mud in said wellbore.

3. The apparatus of claim 2, wherein said mud parameter sensor means measures a pressure of said mud in said wellbore.

4. The apparatus of claim 3, wherein said mud parameter sensor means measures a temperature of said mud in said wellbore.

5. The apparatus of claim 1, wherein said measurement means further comprises:
   an arms assembly connected to said pad assembly, and
   hydraulics assembly means for radially extending said arms assembly when said apparatus is disposed in said wellbore until said flat surface of said pad assembly contacts the surface of said mudcake and said knife edge housing cuts through said . mudcake and penetrates said formation disposed under said mudcake.

6. The apparatus of claim 5, wherein said wellbore is filled with a mud, said apparatus further comprising:
   mud parameter sensor means for measuring a parameter of said mud in said wellbore.

7. The apparatus of claim 6, wherein said mud parameter sensor means measures a pressure of said mud in said wellbore.

8. The apparatus of claim 7, wherein said mud parameter sensor means measures a temperature of said mud in said wellbore.

9. Apparatus for measuring a parameter of a formation traversed by a wellbore, a mudcake adhering to a wall of said formation traversed by said wellbore, comprising:
   means for measuring said parameter of said formation when disposed in contact with said wall of said formation, said pad assembly means including,
   face means for contacting a surface of said mudcake,
   knife edge means protruding from said flat surface means of said pad assembly means for cutting into said mudcake and contacting at least said wall of said formation under said mudcake when said flat surface means contacts said mudcake, and
   sensor means disposed within said knife edge means for measuring said parameter of said formation when said knife edge means cuts into said mudcake and contacts at least said wall of said formation; and
   means for moving said pad assembly means until said pad assembly means is disposed in contact with said wall of said formation.

10. The apparatus of claim 9, wherein said means for moving includes an arms assembly means connected to the pad assembly means for moving said pad assembly into contact with said wall of said formation.

11. The apparatus of claim 10, wherein the means for moving includes a hydraulics assembly means for extending and retracting said arms assembly means, said pad assembly means being disposed in contact with said wall of said formation when said hydraulics assembly means extends said arms assembly means.

12. A method of measuring a parameter of a formation traversed by a wellbore when a mudcake adheres to a wall of said formation in said wellbore, comprising the steps of:
   . moving a pad assembly until a flat surface of said pad assembly contacts said mudcake on said wall of said formation, said pad assembly including a knife edge section protruding outwardly from said flat surface and a sensor disposed within said knife edge section;
   using said knife edge section contacts at least said wall of said said knife edge section contacts at least said wall of said formation disposed under said mudcake; and
   using said sensor, measuring said parameter of said formation traversed by said wellbore.

13. The method of claim 12, wherein the pad assembly is connected to an arms assembly, and wherein the moving step comprises the step of:
   extending the arms assembly radially in said wellbore until the flat surface of said pad assembly contacts said mudcake adhering to said wall of said formation, said knife edge section cutting into said mudcake and contacting at least said wall of said formation when said flat surface of said pad assembly contacts said mudcake on said wall of said formation.

14. The method of claim 13, wherein the extending step further comprises the step of:
   spring biasing the arms assembly radially in an outward direction until said flat surface contacts said mudcake and said knife edge section cuts into said mudcake thereby contacting said wall of said formation.

15. A measurement apparatus adapted to be disposed in a wellbore for measuring parameters of said wellbore, a mudcake adhering to a wall of a formation traversed by said wellbore, a mud filling said wellbore, comprising:
   means for measuring a pressure of said mud in said wellbore;
   means for measuring a temperature of said mud in said wellbore; and
   formation parameter measurement means for measuring a parameter of the formation traversed by said wellbore, the formation parameter measurement means including,
   a pad assembly adapted to be extended and retracted radially in said wellbore, said pad assembly including,
   a flat surface adapted to contact a surface of said mudcake adhering to said wall of said formation when said pad assembly is radially extended in said wellbore,
   a knife edge portion protruding outwardly from said flat surface of said pad assembly, said knife edge portion adapted to cut into said mudcake and contact at least said wall of said formation disposed under the mudcake when said flat surface contacts said surface of said mudcake, and
   sensor means disposed within said knife edge portion of said pad assembly for measuring the parameter of the formation traversed by the wellbore when said knife edge portion cuts into said mudcake and contacts at least said wall of said formation.

16. The measurement apparatus of claim 15, wherein the parameter measured by the sensor means of the formation parameter measurement means is a temperature of the formation.

17. An apparatus adapted to be disposed in a wellbore for measuring one or more parameters associated with said wellbore, a layer adhering to a wall of a formation traversed by said wellbore, comprising:
   a pad assembly adapted to contact said layer and measure a parameter of said formation disposed under said layer, said pad assembly including,
   a flat surface adapted for contacting a surface of said layer, a knife edge housing connected to and outwardly protruding from said flat surface adapted for cutting through said layer and penetrating said formation disposed under said layer, and parameter sensor means disposed within said knife edge housing for measuring the parameter of said formation disposed under said layer and not a parameter of said layer when said flat surface contacts the surface of said layer and said knife edge housing cuts into said layer and penetrates said formation disposed under said layer.

18. The apparatus of claim 17, wherein said wellbore is filled with a fluid, further comprising:

fluid parameter sensor means for measuring a parameter of said fluid in said wellbore.

19. The apparatus of claim 18, wherein said fluid parameter sensor means measures a temperature of said fluid in said wellbore.

20. The apparatus of claim 19, wherein said fluid parameter sensor means measures a pressure of said fluid in said wellbore.

21. The apparatus of claim 20, further comprising:
an arms assembly connected to said pad assembly; and
hydraulics assembly means for radially extending said arms assembly when said apparatus is disposed in said wellbore until said flat surface of said pad assembly contacts the surface of said layer and said knife edge housing cuts through said layer and penetrates said formation disposed under said layer.

22. The apparatus of claim 17, wherein said parameter sensor means measures a temperature of said formation disposed under said layer.

* * * * *

UNITED STATES PATENT AND TRADEMARK OFFICE
CERTIFICATE OF CORRECTION

PATENT NO. : 5,302,781

DATED : April 12, 1994

INVENTOR(S) : Thomas H. Hanson

It is certified that error appears in the above-identified patent and that said Letters Patent is hereby corrected as shown below:

Claim 9, line 5 (column 11, line 32), change "means" to
--pad assembly means--;

Claim 9, line 8 (column 11, line 35), change "face" to
--flat surface--;

Claim 12, line 11 (column 12, line 1), delete "contacts at least said"; and

Claim 12, line 12 (column 12, line 2), change "wall of said said knife edge section" to -- cutting into said mudcake until said knife edge section--.

Signed and Sealed this

Eleventh Day of October, 1994

Attest:

BRUCE LEHMAN

*Attesting Officer*      *Commissioner of Patents and Trademarks*